United States Patent
Lugosch

(10) Patent No.: US 9,612,043 B2
(45) Date of Patent: Apr. 4, 2017

(54) MIXED HYDROCARBON REFRIGERATION SYSTEM WITH REDUCED WORK-ENERGY REQUIREMENTS USING A HYBRID COMPRESSION/ADSORPTION HEAT CYCLE

(71) Applicant: AZOTA GAS PROCESSING, LTD., Houston, TX (US)

(72) Inventor: Pierre E. Lugosch, Houston, TX (US)

(73) Assignee: AZOTA GAS PROCESSING, LTD., Houston, TX (US)

( * ) Notice: Subject to any disclaimer, the term of this patent is extended or adjusted under 35 U.S.C. 154(b) by 308 days.

(21) Appl. No.: 14/465,419

(22) Filed: Aug. 21, 2014

(65) Prior Publication Data

US 2016/0054035 A1 Feb. 25, 2016

(51) Int. Cl.
*C09K 5/04* (2006.01)
*F25B 9/00* (2006.01)
*F25B 25/02* (2006.01)

(52) U.S. Cl.
CPC .............. *F25B 9/006* (2013.01); *C09K 5/042* (2013.01); *C09K 5/047* (2013.01); *F25B 25/02* (2013.01); *Y02P 20/124* (2015.11)

(58) Field of Classification Search
CPC .. F25B 25/02; F25B 9/006; F25B 9/00; Y02P 20/124; C09K 5/047; C09K 5/042; C09K 5/04
USPC .......................................................... 62/101
See application file for complete search history.

(56) References Cited

U.S. PATENT DOCUMENTS

| | | |
|---|---|---|
| 1,325,667 A | 12/1919 | Crawford |
| 1,497,615 A | 6/1924 | Thompson |
| 2,146,884 A | 2/1939 | Daudt |
| 4,482,465 A | 11/1984 | Gray |
| 5,056,323 A | 10/1991 | Rice et al. |
| 5,360,566 A | 11/1994 | Stevenson |
| 5,363,664 A | 11/1994 | Beakley et al. |
| 6,336,333 B1 | 1/2002 | Lindgren |
| 6,902,686 B2 | 6/2005 | Maruya |
| 8,069,687 B2 | 12/2011 | Jork et al. |
| 8,506,839 B2 | 8/2013 | Shiflett et al. |
| 2008/0016903 A1* | 1/2008 | Artsiely ................. C09K 5/047 62/476 |

* cited by examiner

*Primary Examiner* — Len Tran
*Assistant Examiner* — Ana Vazquez
(74) *Attorney, Agent, or Firm* — Mossman, Kumar & Tyler, PC

(57) ABSTRACT

A refrigeration method reduces compressor energy usage in a hydrocarbon refrigeration system by incorporating a distillation/adsorption cycle. The method and related systems can use waste or other heat sources to replace a portion of the mechanical energy of the compression cycle in a novel process scheme easily adapted to either new or existing refrigeration systems. The present hybrid vapor compression-adsorption cycle combines both the refrigerant and adsorption medium in the compression cycle and separates these components using conventional multi-stage distillation to then separate them for the refrigeration and adsorption cycles.

7 Claims, 3 Drawing Sheets

MIXED HYDROCARBON REFRIGERATION SYSTEM WITH REDUCED WORK-ENERGY REQUIREMENTS USING A HYBRID COMPRESSION/ADSORPTION HEAT CYCLE

CROSS REFERENCE TO RELATED APPLICATIONS

None.

BACKGROUND

1. Field of the Disclosure

The present disclosure relates to a hybrid vapor compression-absorption cooling system utilizing a refrigerant pair comprising at least one refrigerant and at least one absorbent.

2. Background of the Disclosure

The use of compression cycles and adsorption cycles are known in the art. Both of these systems require raising the pressure of the used low pressure refrigerant to a higher pressure so that said refrigerant may be cooled and condensed using a warmer medium. Mechanical compression systems use compressors, either mechanical or jet eductors, for this purpose while adsorption systems pump a liquid adsorption fluid to a pressure great enough to allow the heating, separation and condensing of the refrigerant.

The combining of these two types of systems is also known and has been practiced with advantage since there are advantages which accrue to the overall reduction of mechanical energy, which is relatively expensive, by the substitution of heat energy which may be relatively cheaper. These systems have generally sought to utilize refrigerant/adsorption pairs which can be easily separated such as LiBr and Water, or Ammonia and Water. Despite these theoretical improvements the hybrid compression adsorption cycle has not been extensively used due to limitations of the art using these refrigerant/adsorption pairs.

The present disclosure provides novel refrigerant/adsorption pairs that can enhance the efficiency of refrigerant/adsorption cycles by reducing the need for mechanical energy.

SUMMARY

In aspects, the present disclosure uses the perfect or near-perfect miscibility of various light hydrocarbons to reduce the energy requirements associated with compressing the refrigerants. The described refrigeration cycles use various light hydrocarbon mixtures which might include alkanes such as ethane, propane, butane, etc, and alkenes such as ethylene, propylene, butylenes, and so forth. In non-limiting embodiments, the described refrigeration cycles use only paraffinic hydrocarbon pairs such as propane and butane/pentane/hexane. These hydrocarbons are combined in a compression/condensing portion of the cycle and then separated into the lighter refrigerant component and heavier adsorption component in a distillation operation.

In one non-limiting implementation, a hydrocarbon vapor (the refrigerant) of molecular weight equal to or greater than ethane is compressed to a pressure less than that normally needed for condensation in a conventional system. Next, this hydrocarbon vapor is mixed with a hydrocarbon liquid (sorbent) of at least one carbon greater molecular weight, which condenses this mixture. The condensed mixture is pumped to a higher pressure. Thereafter, this mixture is distilled into an overhead product and a bottom product, the refrigerant and the sorbent, respectively. By mixing the heavier bottom product of this distillation with the compressed hydrocarbon vapor as previously described, the discharge pressure of the compression step may be reduced, which reduces the energy requirements of the system for the same quantity of refrigeration.

In another non-limiting implementation, a process begins with a condensed liquid refrigerant, which is either a pure hydrocarbon or a mixture of several hydrocarbons. The hydrocarbon refrigerant may be in the molecular weight range of ethane, propane and butane. The liquid refrigerant is delivered to the chiller, where the refrigerant is vaporized, thereby cooling another process stream and performing the main objective of any refrigerant system.

The cold vaporized refrigerant from the chiller is then compressed using the gas compression device to a higher pressure but a pressure less than that normally required for the condensation of such a refrigerant. At this point, the sorption stream, which is a hydrocarbon stream, of at least one additional carbon atom higher molecular weight, is mixed with the compressed refrigerant stream, causing the partial condensation of this refrigerant stream.

This combined hydrocarbon stream is then cooled further, typically using air or cooling water, until it is largely condensed. This condensed hydrocarbon stream is then pumped using the liquid pumping device to a pressure sufficiently high that the adsorbed refrigerant phase, when separated, will be condensable, again typically using air or cooling water.

The mixed high pressure hydrocarbon stream is then delivered to the reboiled distillation column at a point between a rectifying and stripping sections. Vapor leaving the overhead portion of the distillation column is condensed. A portion of the condensed vapor serves as a reflux to the column. The remainder constitutes the liquid refrigerant used for cooling the separate process stream as discussed above. The bottom of the distillation column produces the sorbent stream consisting of one or more hydrocarbons of at least one greater carbon number than the refrigerant. Heat for the reboiling of the distillation column may be derived from any waste heat or other heat source of greater temperature than the column bottom product.

The liquid sorbent stream is then cooled to roughly ambient temperature and combined as previously described with the refrigerant vapor stream leaving the compression device as previously described.

In aspects, the present disclosure provides a mixed refrigerant process. The process may include the steps of: supplying a hydrocarbon refrigerant with a molecular weight of between 30 and 70 to a pressure reducer, the hydrocarbon refrigerant being a liquid when supplied; reducing the pressure of the liquid hydrocarbon refrigerant to produce a two phase refrigerant; delivering the two phase hydrocarbon refrigerant to at least one heat exchanger to cool to at least one process stream, wherein the two phase hydrocarbon refrigerant is vaporized in the at least one heat exchanger; compressing the vaporized two phase hydrocarbon refrigerant to a pressure less than a baseline refrigerant pressure, the baseline refrigerant pressure being a pressure required to condense a vapor fraction of the two phase hydrocarbon refrigerant at an ambient condition surrounding the hydrocarbon refrigerant; mixing a sorbent hydrocarbon of a molecular weight at least 14 greater than the hydrocarbon refrigerant with the two phase hydrocarbon refrigerant to form a hydrocarbon mixture; cooling the hydrocarbon mixture until the hydrocarbon mixture is substantially condensed; increasing a pressure of the hydrocarbon mixture to a pressure less than the baseline refrigerant pressure; fractionally distilling the hydrocarbon mixture into a lighter overhead hydrocarbon stream and a heavier hydrocarbon liquid in a distillation tower, the lighter overhead hydrocarbon stream being the liquid hydrocarbon refrigerant and the heavier hydrocarbon liquid being the sorbent hydrocarbon, and cooling the sorbent hydrocarbon.

In aspects, the present disclosure also provides a system using mixed refrigerants. The system may include a hydrocarbon refrigerant with a molecular weight of between 30 and 70; a sorbent hydrocarbon of a molecular weight at least 14 greater than the hydrocarbon refrigerant; a pressure reducer reducing a pressure of the hydrocarbon refrigerant to produce a two phase hydrocarbon refrigerant; at least one heat exchanger using the two phase hydrocarbon refrigerant to cool at least one process stream, wherein the two phase hydrocarbon refrigerant is vaporized in the at least one heat exchanger; a first pumping device compressing the vaporized two phase hydrocarbon refrigerant to a pressure less than a baseline refrigerant pressure, the baseline refrigerant pressure being a pressure required to condense a vapor fraction of the two phase hydrocarbon refrigerant at an ambient condition; a mixer mixing the sorbent hydrocarbon with the hydrocarbon refrigerant from the pumping device to form a hydrocarbon mixture; a cooling device cooling the hydrocarbon mixture until the hydrocarbon mixture is substantially condensed; a second pumping device increasing a pressure of the hydrocarbon mixture to a pressure less than the baseline refrigerant pressure; and a distillation tower fractionally distilling the hydrocarbon mixture into a lighter overhead hydrocarbon stream and a heavier hydrocarbon liquid, the lighter overhead hydrocarbon stream being the liquid hydrocarbon refrigerant and the heavier hydrocarbon liquid being the sorbent hydrocarbon stream.

In still another aspect, the present disclosure provides a mixed refrigerant process that includes the steps of cooling a process stream using a hydrocarbon refrigerant having a molecular weight less than 70; mixing the hydrocarbon refrigerant with a sorbent hydrocarbon to form a hydrocarbon mixture, wherein the sorbent hydrocarbon has a molecular weight that is greater than the molecular weight of the hydrocarbon refrigerant; and fractionally distilling the hydrocarbon mixture into a lighter overhead hydrocarbon stream and a heavier hydrocarbon liquid in a distillation tower, the lighter overhead hydrocarbon stream being the hydrocarbon refrigerant and the heavier hydrocarbon liquid being the sorbent hydrocarbon.

It should be understood that examples of certain features of the disclosure have been summarized rather broadly in order that detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE FIGURES

For detailed understanding of the present disclosure, references should be made to the following detailed description of the preferred embodiment, taken in conjunction with the accompanying drawings, in which like elements have been given like numerals and wherein.

DETAILED DESCRIPTION

The present disclosure relates to using mixed hydrocarbons in refrigeration systems to significantly reduce the mechanical energy requirements of this service. The described refrigeration cycles use various light hydrocarbon mixtures may might include alkanes such as ethane, propane, butane, etc, and alkenes such as ethylene, propylene, butylenes, and so forth. In embodiments, the hydrocarbon refrigerants may consist of light hydrocarbons in a molecular weight range of ethane to octane. The present teachings may be advantageous where there is excess or waste heat available in a processing plant as this heat is used to reduce the overall energy requirements of the refrigeration compression service.

Figure 1:
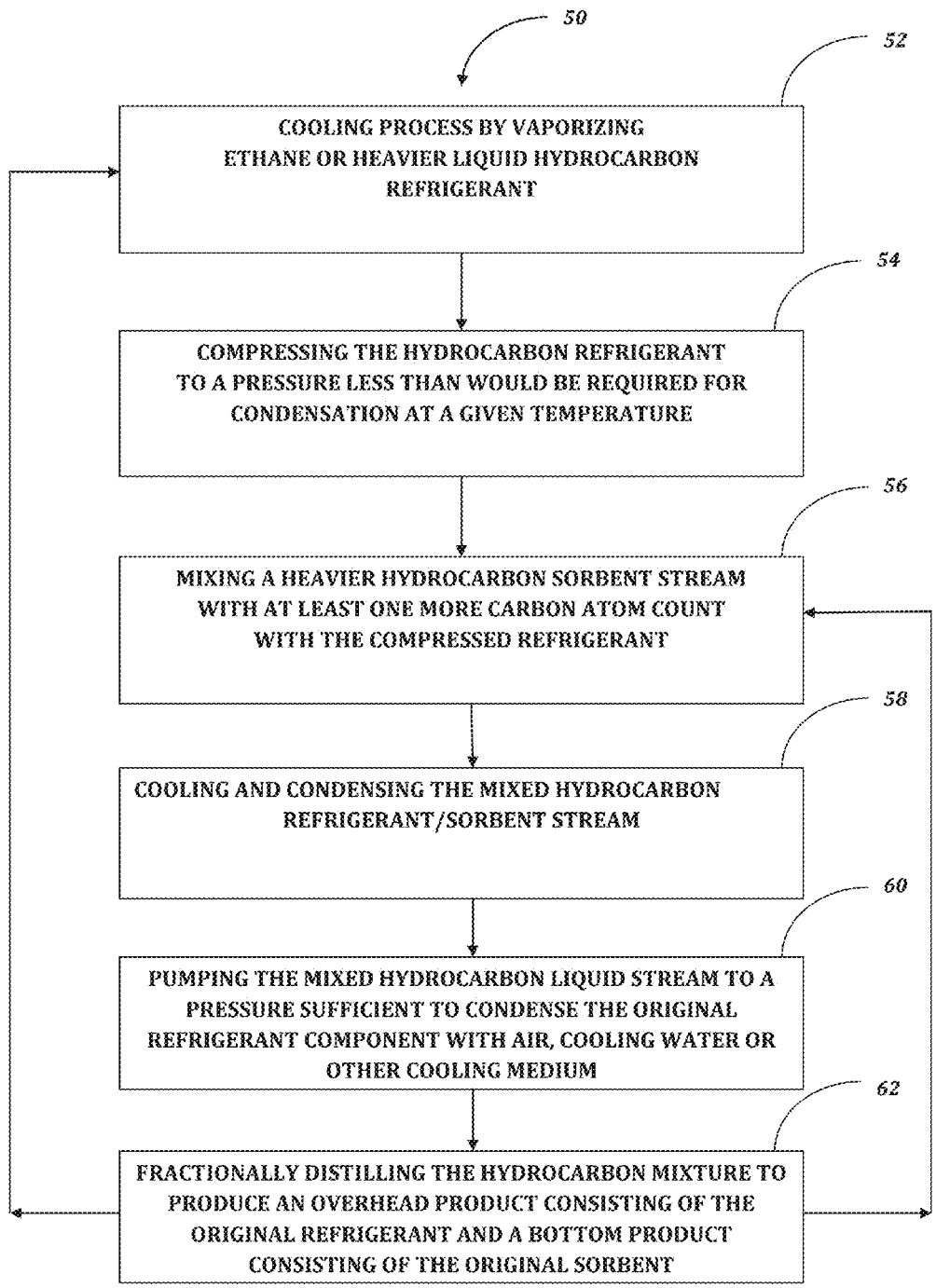
FIG. 1 is a flow chart depicting an illustrative method for providing low temperature refrigeration in one embodiment of the present disclosure.

Referring initially to FIG. 1, there is shown a general flow schematic of an illustrative process 50 of the present disclosure. The process 50 consists of an evaporation step 52 in which a refrigerant stream is vaporized as with any refrigeration application, which provides the desired cooling. This is followed by a vapor compression step 54 in which the vaporized refrigerant is compressed. Next, a mixing step 56 occurs in which another less volatile hydrocarbon liquid sorbent stream is mixed with the compressed refrigerant vapors. Thereafter, a cooling step 58 is used to cool and condense the mixture. In the following pumping step 60, the liquid mixture is pumped to a higher pressure for fractionation. Finally, in a fractionating step 62, the liquid mixture of refrigerant and sorbent is fractionated in a distillation column with the liquid overheads forming the refrigerant stream and the bottom liquids forming the sorbent stream.

Figure 2:
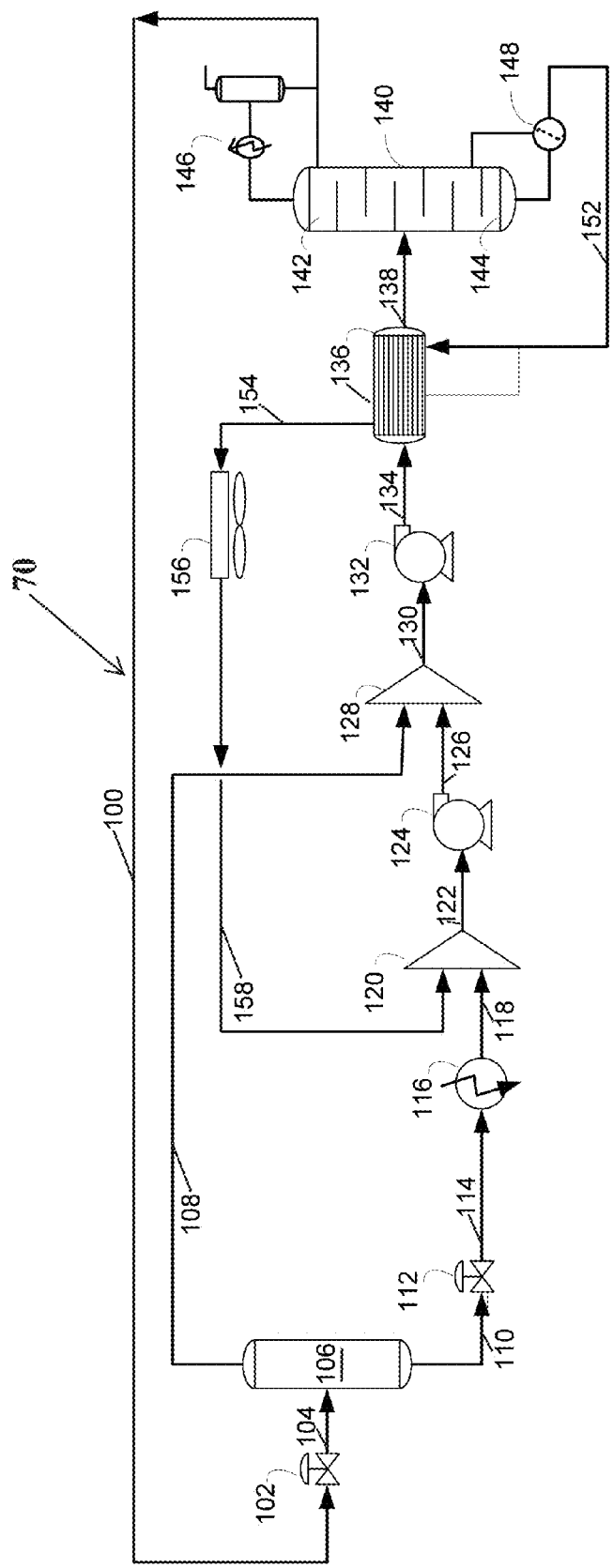
FIG. 2 schematically illustrates a refrigeration system according to one embodiment of the present disclosure.

FIG. 2 illustrates a mixed refrigerant refrigeration system 70 in accordance with one embodiment of the present disclosure. The system 70 uses a refrigerant stream and a sorbent stream that each use a hydrocarbon in a molecular weight range from that of ethane to that of octane.

In the mixed refrigeration system 70, a liquid refrigerant at a temperature near ambient is delivered via line 100 from a condensing unit 146 to a letdown valve 102. As used herein, an ambient temperature is the temperature of the environment in which the system 70 operates. The letdown valve 102 reduces the pressure of the liquid refrigerant to produce a colder two phase refrigerant stream in line 104. The two phase stream is delivered via line 104 to a phase separation device 106, typically called an economizer. There, the liquid and vapor phases are separated and conveyed out of the economizer 106 via lines 110 and 108, respectively. The line 110 conveys the liquid refrigerant stream to another letdown valve 112, which further reduces the pressure in the liquid refrigerant stream and produces a colder two phase refrigerant stream in line 114. This two phase refrigerant stream is then completely vaporized in heat exchanger 116, which is commonly referred to as a chiller. The chiller provides the refrigeration service. A cold vapor refrigerant stream exits the chiller 116 via line 118.

A low stage absorption device 120 mixes the cold vapor refrigerant stream received from line 118 with a liquid sorbent stream received from a line 158. The low stage absorption device 120 may be a simple mixer or a mixing chamber. The liquid sorbent completely condenses and adsorbs the cold vapor refrigerant stream. The resultant liquid hydrocarbon mixture flowing in line 122 is then pumped using pumping device 124 to a pressure approximately that of the separator vessel 106. At this point in the process, the vapor refrigerant stream in line 108 is combined with the liquid hydrocarbon mixture in line 126 in a high stage absorption device 128, which may be similar to the low stage absorption device 120. Here, the liquid hydrocarbon mixture received from line 126, which acts as a sorbent, mixes with the cold vapor refrigerant stream from line 108. The mixture completely condenses and adsorbs this cold vapor refrigerant stream. A resultant liquid hydrocarbon stream exits the low stage adsorption device 120 via line 130.

The resultant liquid hydrocarbon stream in line 130 is pumped using pumping device 132 to a pressure sufficiently high to permit the condensation of the refrigerant vapor fraction 100 at ambient temperatures using air, cooling water or other cooling medium. The pumping 132 may be a pump or any other conventional device configured to increase the pressure of a fluid. The pumping device 132 discharges a pressurized liquid hydrocarbon stream in line 134. The discharge may be preheated in a feed/bottoms cross exchanger, 136, before being directed via line 138 to a generator tower 140.

The generator tower 140 separates the liquid hydrocarbon stream received via line 138 into the refrigerant stream and the sorbent stream. The generator tower 140 may be a refluxed, reboiled fractionating tower containing a rectifying section 142 and a stripping section 144. The overhead product of this distillation tower 140 can be condensed in the overhead condenser 146 in order to produce a tower reflux stream as well as the liquid refrigerant stream fed into line 100. The distillation tower bottom product exits via line 152 and is the sorbent stream. The sorbent stream in line 152 may be cooled sequentially in the aforementioned feed/bottoms exchanger 136 and a sorbent air cooler 156. The cooled sorbent stream in line 158 is then returned to the adsorption mixer 120.

Figure 3:
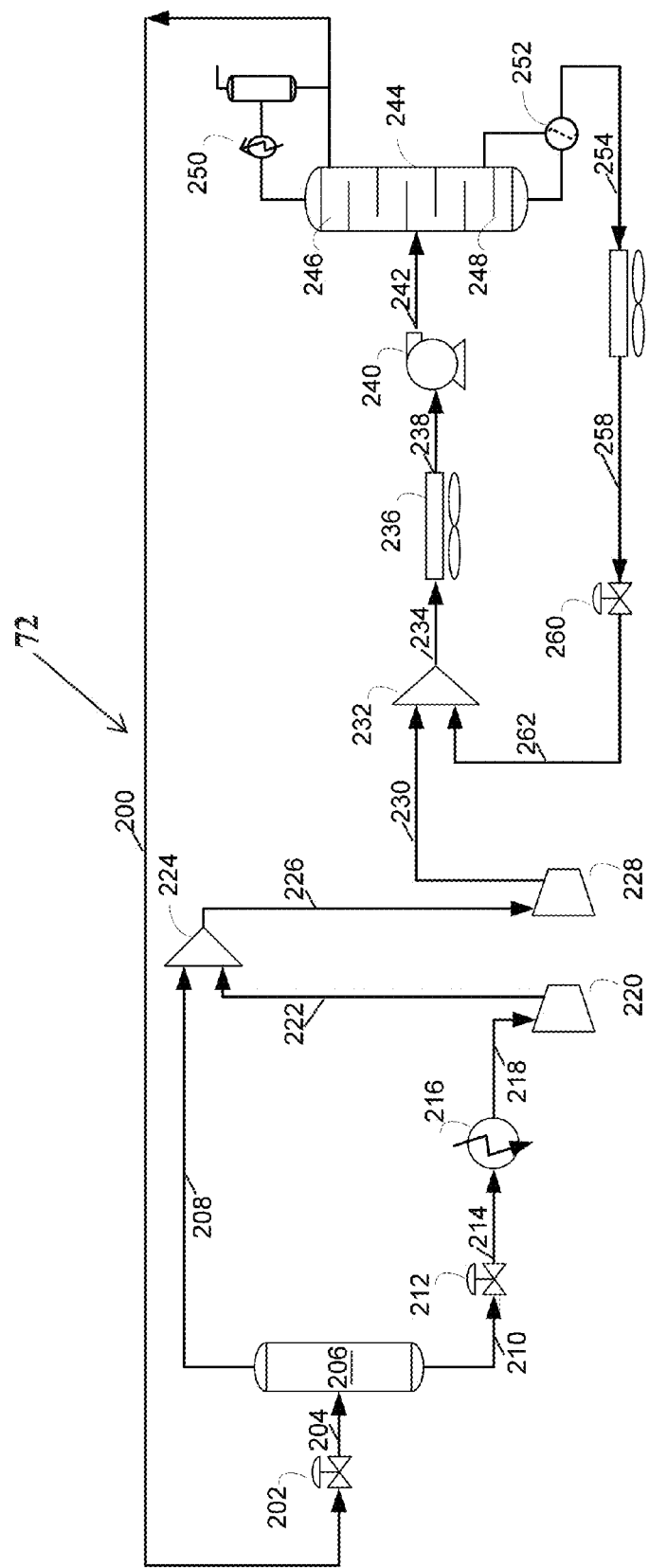
FIG. 3 schematically illustrates a refrigeration system according to one embodiment of the present disclosure.

FIG. 3 illustrates another embodiment of mixed refrigerant system 72 in accordance with the present disclosure. In this embodiment, the system 72 uses a liquid hydrocarbon sorbent stream of higher molecular weight than a refrigerant stream by at least one carbon number.

In this embodiment, a liquid refrigerant in line 200 is delivered from a condensing unit 250 at some temperature near ambient to a letdown valve 202 and is reduced in pressure, thereby producing a colder two phase refrigerant stream in line 204. The two phase refrigerant stream is then delivered via line 204 to a phase separation device 206, the economizer, wherein the liquid and vapor phases are separated. The liquid refrigerant stream exits via line 210 and the vapor refrigerant stream exits via line 208.

The liquid refrigerant stream 210 is reduced in pressure through another letdown valve 212, thereby producing a colder two phase refrigerant stream 214. This refrigerant stream is then completely vaporized in a chiller 216. A cold vapor refrigerant stream exits the chiller 216 via line 218 and flows to the low stage compressor 220. The low stage compressor 220 compresses the cold vapor refrigerant stream to a pressure intermediate between the final condensing pressure (e.g., the pressure in line 200) and the pressure in the chiller 216. The refrigerant stream discharged from the low stage compressor via line 222 is at a pressure approximately that of the separator vessel 206.

At this point, a mixer 224 mixes the vapor refrigerant stream that exits the economizer 206 via line 208 with the refrigerant stream in line 222. The resultant refrigerant vapor stream exiting the mixer 224 via line 226 is further compressed in a high stage compressor 228.

This refrigerant vapor stream is compressed to a pre-determined operating pressure that is lower than a baseline operating pressure. The baseline operating pressure is a pressure which would be required to permit the substantially complete condensation of the refrigerant vapor fraction at an ambient temperature. The vapor fraction may be cooled to ambient using air, cooling water or other cooling medium. The baseline condensation pressure can be experimentally or theoretically determined in a manner well known in the art. By substantially complete condensation, it is meant greater than 95% condensation. In some embodiments, the refrigerant vapor stream is compressed to a pressure significantly lower than the baseline condensation pressure. By significantly lower, it is meant that the pre-determined operating pressure is at least 20% lower than the baseline condensation pressure. For example, in one non-limiting example, a refrigerant vapor fraction that includes propane may have a baseline condensation pressure of 250 PSIA at an ambient temperature of 120 degrees F. Thus, the pre-determined operation pressure may be selected to be 135 PSIA or lower.

The compressed refrigerant vapor stream exits the compressor 228 via line 230. At this point, a mixer 232 mixes the liquid sorbent stream received from line 262 with the vapor refrigerant stream received from line 230. The resulting two phase hydrocarbon stream is then cooled and condensed with either air, cooling water or other cooling medium, in a condensing heat exchanger 236. The combined liquid hydrocarbon stream that leaves the condensing exchanger 236 via line 238 is then delivered to the distillation tower feed pump 240. The pump 240 discharges a pressurized liquid hydrocarbon stream via line 242 and may be preheated in a feed/bottoms cross exchanger (not shown) before being directed to a refrigerant generator tower 244.

The generator tower 244 separates the liquid hydrocarbon stream received via line 242 into the refrigerant stream and the sorbent stream. The refrigerant generator tower may be a refluxed, reboiled fractionating tower that contains a rectifying section 246 and a stripping section 248. The overhead product of this distillation tower 244 may be condensed in the overhead condenser 250 in order to produce a tower reflux stream as well as the liquid refrigerant fed into line 200. The refrigerant stream in line 200 is then recycled to the inlet letdown valve 202 as previously described. The distillation tower bottom product that exits a tower reboiler 252 via line 254 is the sorbent stream. This sorbent stream can be cooled sequentially in a feed/bottoms exchanger (not shown) and a sorbent air cooler 256. The cooled sorbent stream in line 258 is then reduced in pressure across letdown valve 260 returned to the adsorption mixer 232.

It should be understood that the FIG. 3 system is merely one non-limiting embodiment of a compression/absorption refrigeration system according to the present disclosure.

It should be appreciated that an aspect of the present disclosure is the use of one or more hydrocarbons for the refrigerant and the sorbent. The refrigerant may be a hydrocarbon having a molecular weight equal to or greater than ethylene and the sorbent may be a hydrocarbon having at least one carbon greater molecular weight. In embodiments, the selected hydrocarbon refrigerant may have a molecular weight of between 28 and 72. In such embodiments, the sorbent hydrocarbon has a molecular weight at least 14 greater than the selected hydrocarbon refrigerant. In embodiments, the hydrocarbon refrigerant may include methane, ethane, propane, butane, pentane, hydrocarbons having molecular weights between methane and pentane, and mixtures thereof. In embodiments, the sorbent hydrocarbon may include propane, butane, pentane, hexane, heptane, octane, nonane, and decane, hydrocarbons having molecular weights between pentane and decane, and mixtures thereof. These hydrocarbon mixtures may also combine corresponding alkene hydrocarbons such as ethylene, propylene, and butylenes.

The teachings of the present disclosure may be especially suitable for the natural gas separation and hydrocarbon processing fields, which have immediate access to the refrigerants called for by this disclosure. However, the present teachings may be advantageously applied in any number of other industrial or consumer applications.

As a person skilled in the art will recognize from the previous detailed description and from the figures and claims, modifications and changes can be made to the preferred embodiments of the invention without departing from the scope of this invention defined in the following claims.

I claim:

1. A mixed refrigerant process, comprising:
    supplying a hydrocarbon refrigerant with a molecular weight of between 28 and 72 to a pressure reducer, the hydrocarbon refrigerant being a liquid when supplied;
    reducing the pressure of the liquid hydrocarbon refrigerant to produce a two phase refrigerant;
    delivering the two phase hydrocarbon refrigerant to at least one heat exchanger to cool to at least one process stream, wherein the two phase hydrocarbon refrigerant is vaporized in the at least one heat exchanger;
    increasing a pressure of the vaporized two phase hydrocarbon refrigerant to a pressure less than a baseline refrigerant pressure, the baseline refrigerant pressure being a pressure required to condense a vapor fraction of the two phase hydrocarbon refrigerant at an ambient condition surrounding the hydrocarbon refrigerant;
    mixing a sorbent hydrocarbon of a molecular weight at least 14 greater than the hydrocarbon refrigerant with the two phase hydrocarbon refrigerant to form a hydrocarbon mixture;
    cooling the hydrocarbon mixture until the hydrocarbon mixture is substantially condensed;
    increasing a pressure of the hydrocarbon mixture to a pressure greater than the baseline refrigerant pressure;
    fractionally distilling the hydrocarbon mixture into a lighter overhead hydrocarbon stream and a heavier hydrocarbon liquid in a distillation tower, the lighter overhead hydrocarbon stream being the liquid hydrocarbon refrigerant and the heavier hydrocarbon liquid being the sorbent hydrocarbon, and
    cooling the sorbent hydrocarbon.

2. The process of claim 1, further comprising:
    flashing the supplied liquid hydrocarbon refrigerant to remove a vapor portion; and
    mixing the removed vapor portion with the vaporized hydrocarbon refrigerant from the heat exchanger.

3. The process of claim 2, wherein the vapor portion is mixed with the vaporized hydrocarbon refrigerant after the sorbent hydrocarbon is mixed with the hydrocarbon refrigerant stream.

4. The process of claim 1, wherein the hydrocarbon mixture is heated with the sorbent hydrocarbon from the distillation tower.

5. The process of claim 1, wherein the hydrocarbon refrigerant includes at least one of: (i) ethane, (ii) propane, (iii) butane, (iv) ethylene, (v) propylene, and (vi) butylenes.

6. The process of claim 1, wherein the sorbent hydrocarbon includes one of: (i) propylene, (ii) propane, (iii) butane, and (iv) a hydrocarbon having a molecular weight between that of proplyene and decane.

7. A mixed refrigerant process, comprising:
    supplying a hydrocarbon refrigerant with a molecular weight of between 28 and 72 to a pressure reducer, the hydrocarbon refrigerant being a liquid when supplied;
    flashing the supplied liquid hydrocarbon refrigerant to a pressure less than a supplied pressure and greater than a refrigeration pressure to remove a vapor portion;
    reducing the pressure of the liquid hydrocarbon refrigerant to produce a two phase refrigerant;
    delivering the two phase hydrocarbon refrigerant to at least one heat exchanger to cool to at least one process stream, wherein the two phase hydrocarbon refrigerant is vaporized in the at least one heat exchanger;
    increasing a pressure of the vaporized two phase hydrocarbon refrigerant to a pressure less than a baseline refrigerant pressure, the baseline refrigerant pressure being a pressure required to condense a vapor fraction of the two phase hydrocarbon refrigerant at an ambient condition surrounding the hydrocarbon refrigerant;
    mixing a sorbent hydrocarbon of a molecular weight at least 14 greater than the hydrocarbon refrigerant with the two phase hydrocarbon refrigerant to form a hydrocarbon mixture;
    cooling the hydrocarbon mixture until the hydrocarbon mixture is substantially condensed;
    increasing a pressure of the hydrocarbon mixture to a pressure greater than the baseline refrigerant pressure;
    fractionally distilling the hydrocarbon mixture into a lighter overhead hydrocarbon stream and a less volatile hydrocarbon liquid in a distillation tower, the lighter overhead hydrocarbon stream being the liquid hydrocarbon refrigerant and the less volatile bottom product hydrocarbon liquid being the sorbent hydrocarbon, and
    cooling the sorbent hydrocarbon.

* * * * *